US010190505B2

(12) United States Patent
Viel et al.

(10) Patent No.: US 10,190,505 B2
(45) Date of Patent: Jan. 29, 2019

(54) HOUSING FOR DRIVING AN APPARATUS FOR A TURBINE ENGINE

(71) Applicant: SAFRAN TRANSMISSION SYSTEMS, Colombes (FR)

(72) Inventors: Julien Viel, Argenteuil (FR); Stéphane Prunera-Usach, Rueil Malmaison (FR); Bernard Brandt, Taverny (FR); Samuel Raymond Germain Becquerelle, Montigny le Bretonneux (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 191 days.

(21) Appl. No.: 15/119,181

(22) PCT Filed: Feb. 16, 2015

(86) PCT No.: PCT/FR2015/050372
§ 371 (c)(1),
(2) Date: Aug. 16, 2016

(87) PCT Pub. No.: WO2015/124857
PCT Pub. Date: Aug. 27, 2015

(65) Prior Publication Data
US 2017/0009660 A1 Jan. 12, 2017

(30) Foreign Application Priority Data

Feb. 18, 2014 (FR) .................................. 14 51271

(51) Int. Cl.
*F02C 7/32* (2006.01)
*F16H 1/22* (2006.01)
*F02C 7/36* (2006.01)

(52) U.S. Cl.
CPC ............... *F02C 7/32* (2013.01); *F16H 1/222* (2013.01); *F02C 7/36* (2013.01); *F05D 2220/32* (2013.01);
(Continued)

(58) Field of Classification Search
CPC .... F02C 7/32; F02C 7/36; F15H 1/222; F05D 2260/532; F05D 2260/4031; F05D 2220/32; F05D 2260/53
See application file for complete search history.

(56) References Cited

U.S. PATENT DOCUMENTS 2,803,943 A  8/1957 Rainbow
4,068,470 A  1/1978 Sargisson et al.
(Continued)

FOREIGN PATENT DOCUMENTS

EP  2 535 544 A2  12/2012
FR  970 075 A    12/1950
(Continued)

OTHER PUBLICATIONS

International Search Report as issued in International Patent Application No. PCT/FR2015/050372, dated May 11, 2015.

*Primary Examiner* — Karen Beck
(74) *Attorney, Agent, or Firm* — Pillsbury Winthrop Shaw Pittman LLP

(57) ABSTRACT

A gearbox to be attached to a turbine engine to drive at least one apparatus annexed to the turbine engine, the gearbox including a housing; a power take-off member capable of engaging with a radial shaft of the turbine engine; at least one kinematic chain located inside the housing and capable of transmitting the rotational movement of the power take-off member to at least one rotatable shaft of an apparatus. The kinematic chain includes a first end and a second end. The power take-off member is linked to the kinematic chain
(Continued)

by a gear having convergent axes and located between the first end and the second end of the kinematic chain.

8 Claims, 2 Drawing Sheets

(52) U.S. Cl.
CPC .. *F05D 2250/75* (2013.01); *F05D 2260/4031* (2013.01); *F05D 2260/53* (2013.01); *F05D 2260/532* (2013.01)

(56) References Cited

U.S. PATENT DOCUMENTS

| | | | | |
|---|---|---|---|---|
| 2003/0115885 A1* | 6/2003 | MacFarlane | ............ | F02C 6/206 60/793 |
| 2003/0192400 A1* | 10/2003 | Cordeiro | ................ | F16H 1/222 74/665 A |
| 2006/0248900 A1 | 11/2006 | Suciu et al. | | |
| 2011/0289936 A1 | 12/2011 | Suciu et al. | | |
| 2012/0117982 A1* | 5/2012 | Suciu | ........................ | F02C 7/32 60/802 |
| 2014/0020506 A1* | 1/2014 | Duong | .................... | F16H 1/222 74/665 GB |
| 2014/0026589 A1* | 1/2014 | Goi | ........................... | F02C 7/32 60/784 |
| 2015/0369355 A1* | 12/2015 | Beier | ........................ | F16D 1/10 74/468 |
| 2016/0040601 A1* | 2/2016 | Frost | ........................ | F02C 7/32 415/122.1 |
| 2016/0138414 A1* | 5/2016 | Armange | ................ | F16H 1/225 415/182.1 |
| 2016/0245183 A1* | 8/2016 | Viel | .......................... | F02C 7/32 |
| 2017/0218848 A1* | 8/2017 | Alstad | ..................... | F02C 7/232 |
| 2017/0314473 A1* | 11/2017 | Morreale | .................. | F02C 7/16 |
| 2018/0079510 A1* | 3/2018 | Bacic | ..................... | B64D 13/04 |

FOREIGN PATENT DOCUMENTS

| | | |
|---|---|---|
| FR | 2 290 576 A1 | 6/1976 |
| FR | 2 941 744 A1 | 8/2010 |

* cited by examiner

HOUSING FOR DRIVING AN APPARATUS FOR A TURBINE ENGINE

CROSS-REFERENCE TO RELATED APPLICATIONS

This application is the U.S. National Stage of PCT/FR2015/050372, filed Feb. 16, 2015, which in turn claims priority to French Application No. 1451271, filed Feb. 18, 2014. The contents of all of these applications are incorporated herein by reference in their entirety.

TECHNICAL FIELD

The present invention relates to a gearbox for driving an apparatus for a turbine engine, also called an accessory gear box or AGB. Such an accessory gearbox is intended to transmit the movement originating from the turbine engine through a radial shaft emerging from the latter, and to transmit it to various accessories or items of apparatus annexed to the turbine engine, such as pumps, electricity generators etc., which are essential to the operation of the turbine engine or to other items of equipment of an aircraft propelled by this turbine engine. The accessory gearbox also allows power to be transmitted from the apparatus to the engine during starting phases. The transmission is achieved by a kinematic chain composed of successive gears.

STATE OF THE PRIOR ART

Document FR no. 12 58196 describes a gearbox to be fixed to a turbine engine in order to drive at least one apparatus annexed to the turbine engine. This gearbox is shown more precisely in FIG. 1. It comprises:
- a power take-off member 1 intended to engage with a radial shaft of the turbine engine,
- a housing 44;
- two kinematic chains 2, 3 located inside the housing. Each kinematic chain 2, 3 comprises gears linked to each other. Each gear allows a rotatable shaft of an apparatus to be driven so that it rotates. The two kinematic chains 2, 3 are located in non-parallel planes. The power take-off member 1 is connected to each kinematic chain at one of the ends 4, 5 of said kinematic chain.

Document FR no. 13 59910 describes another type of gearbox to be fixed to a turbine engine in order to drive at least one apparatus annexed to the turbine engine. This gearbox comprises:
- a power take-off member intended to engage with a radial shaft of the turbine engine,
- a housing,
- a kinematic chain located inside the housing. The kinematic chain comprises a central shaft which transmits the movement of the power take-off member to at least one gear capable of driving at least one rotatable shaft of an apparatus so that it rotates. The power take-off member is connected to the central shaft at one of the ends of the central shaft.

In these two documents, however, the power take-off is constrained and it cannot be achieved on all the shafts of the turbine engine.

DESCRIPTION OF THE INVENTION

The aim of the invention is to overcome the drawbacks of the state of the art by proposing a gearbox to be fixed to a turbine machine in order to drive at least one apparatus annexed to the turbine machine which offers greater latitude in achieving the power take-off, in particular by allowing the power take-off to be achieved on the high-pressure shaft of a turbine engine, on its low-pressure shaft or on its intermediate shaft.

In order to achieve this, according to a first aspect of the invention, a gearbox is proposed to be fixed to a turbine engine in order to drive at least one apparatus annexed to the turbine engine, where the gearbox comprises:
- A housing;
- A power take-off member capable of engaging with a radial shaft of the turbine engine;
- At least one kinematic chain located inside the housing capable of transmitting the rotational movement of the power take-off member to at least one rotatable shaft of an apparatus, where the kinematic chain comprises a first end and a second end, the power take-off member being linked to the kinematic chain by a gear having convergent axes located within the kinematic chain.

Thus the invention proposes that the power take-off member no longer be linked to the kinematic chain at an end of the kinematic chain, but at a point strictly between the two ends of the kinematic chain. The fact that the power take-off member is relocated to within the kinematic chain allows a greater degree of latitude for achieving the power take-off on a turbine engine shaft, and therefore latitude in the installation of the gearbox. In particular the aircraft power take-off can now be achieved not in the intercompressor housing zone but at another engine shaft location, such as for example on the intermediate shaft, or between the turbine and the combustion chamber, or between the compressor and the turbine.

The gearbox may also exhibit one or more of the following characteristics, taken independently or according to all technically possible combinations.

According to a first embodiment, known as "column gearbox", the kinematic chain comprises at least one central shaft capable of transmitting the movement of the power take-off member to at least one rotatable shaft of an apparatus through at least one intermediate gear, where the central shaft comprises two ends, the power take-off member being linked to the central shaft by a gear having convergent axes located between the first end and the second end of the central shaft. Thus in this embodiment, the movement of the power take-off member is transmitted to the rotatable shaft of the apparatus through a central shaft, which saves space and allows greater latitude in the layout of the gearbox.

Advantageously, the power take-off member extends along a direction which forms a secant with that of the central shaft.

Advantageously the central shaft comprises a first and second part, with the power take-off member being linked to the first part by a first gear with convergent axes and to the second part by a second gear with convergent axes. This means that the relocation of the power take-off member in this case allows the central shaft to be broken down into two parts which are linked independently of each other to the central shaft.

In this case the first gear having convergent axes preferably exhibits a reduction ratio which is different from that of the second gear having convergent axes, so that the two parts of the central shaft may thus rotate at different speeds. Thus slow apparatus may be linked to one of the two parts of the central shaft, whilst fast apparatus are linked to the other part of the central shaft, allowing the kinematic chain to be optimised.

According to a second embodiment, known as a "V gearbox", the gearbox comprises two kinematic chains, each kinematic chain being capable of transmitting the rotation movement of the power take-off member to at least one rotatable shaft of an apparatus, each kinematic chain comprising a first end and a second end, the power take-off member being linked to each kinematic chain by a gear having convergent axes located between the first and the second end of each kinematic chain.

Advantageously, each kinematic chain comprises a gear train, with the two gear trains extending along directions forming a secant.

According to different embodiments, the two gears having convergent axes may exhibit reduction ratios which are different or which are equal.

A second aspect of the invention relates to a turbine engine comprising a gearbox according to one of the preceding claims.

According to different embodiments:
the turbine engine comprises a high-pressure shaft, with the power take-off member being linked to the high-pressure shaft;
the turbine engine comprises a low-pressure shaft, with the power take-off member being linked to the low-pressure shaft;
the turbine engine comprises an intermediate shaft, with the power take-off member being linked to the intermediate shaft;

BRIEF DESCRIPTION OF DRAWINGS

Other characteristics and advantages of the invention will emerge on reading the detailed description which follows, with reference to the appended figures, which show.

For improved clarity, identical or similar elements are identified by the same reference signs in all figures.

DETAILED DESCRIPTION OF AT LEAST ONE EMBODIMENT

Figure 1:
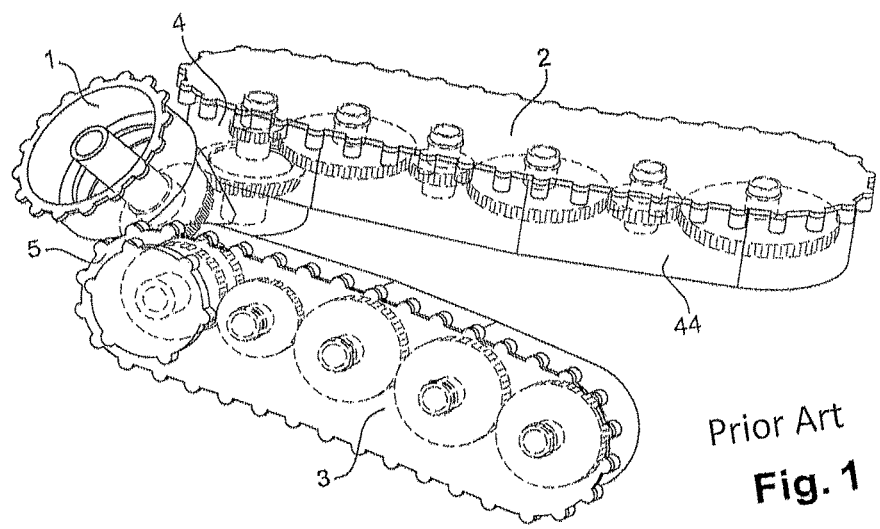
FIG. 1, a schematic perspective representation of a gearbox of the prior art.
Figure 2:
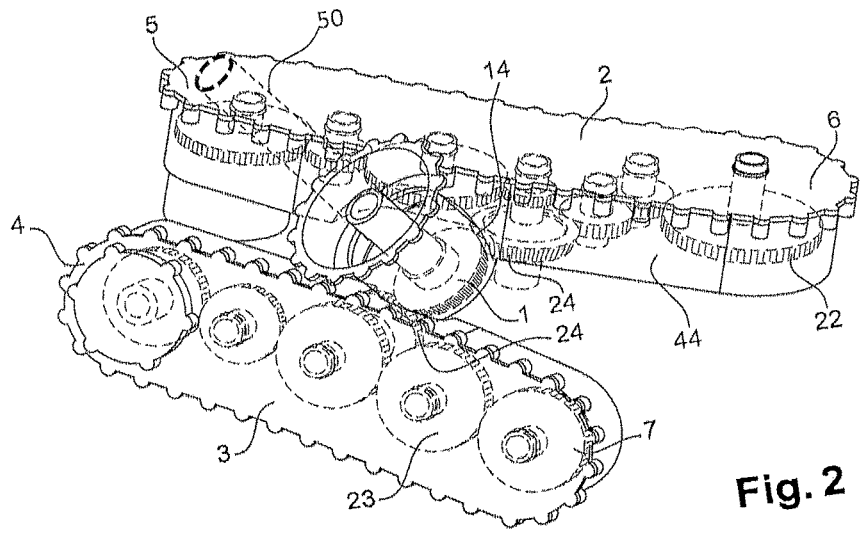
FIG. 2, a schematic perspective representation of a gearbox according to a first embodiment of the invention.

FIG. 2 shows a gearbox according to an embodiment of the invention known as "V gearbox". This gearbox comprises:

A housing 44;
A power take-off member 1;
A first and a second kinematic chain 2, 3. Each kinematic chain 2, 3 comprises an intermediate gear train 22, 23. Each intermediate gear 22, 23 is preferably capable of driving a rotatable shaft of an apparatus so that it rotates. Each kinematic chain 2, 3 comprises a first end 4, 5 and a second end 6, 7.

Unlike gearboxes of the prior art wherein the power take-off member 1 is linked to each kinematic chain at one of these ends, in this embodiment the power take-off member 1 is linked to each kinematic chain 2,3 at a zone 14 located within this kinematic chain. In other terms the zone 14 is located strictly between the two ends 4, 6 and 5, 7 of each kinematic chain 2, 3. More precisely, the power take-off member 1 is preferably linked to each kinematic chain at one of these intermediate gears 22, 23 which is inserted between two intermediate gears in the kinematic chain. The location of the power take-off member 1 can also be chosen depending on the radial shaft of the turbine engine to which it is linked. FIG. 2 schematically shows the power take-off member 1 linked to an intermediary shaft 50 of the turbine engine.

The power take-off member 1 is preferably linked to each kinematic chain by a gear 24 having convergent axes. According to one embodiment, the gear 24 having convergent axes which joins the power take-off member 1 to the first kinematic chain 2 can exhibit a reduction ratio which is different from that which links the power take-off member 1 to the second kinematic chain 3. Thus slow apparatus may be connected to one of the two kinematic chains, whilst fast apparatus are connected to the other.

Figure 3:
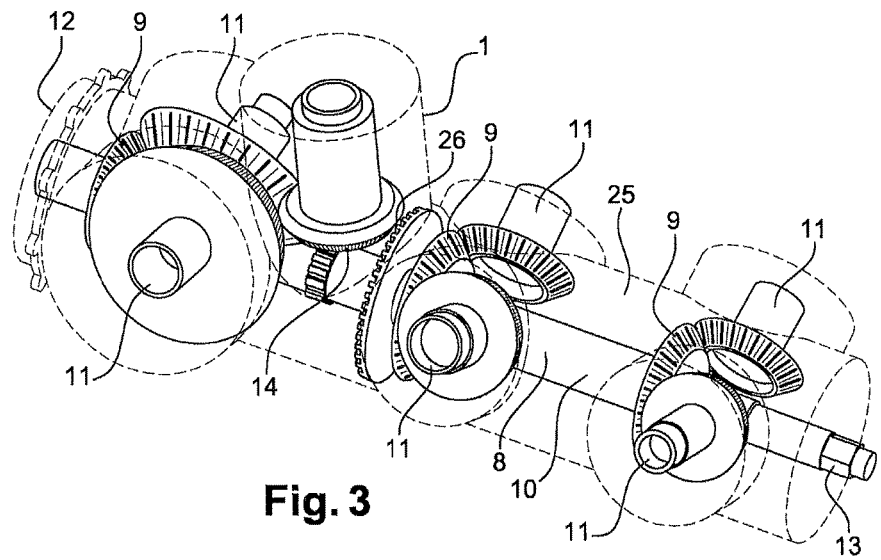
FIG. 3, a schematic perspective representation of a gearbox according to a second embodiment of the invention.

FIG. 3 shows a gearbox according to another embodiment of the invention known as "column gearbox".

In this embodiment the gearbox comprises:
A housing 25;
A power take-off member 1;
A kinematic chain 8.

The kinematic chain 8 comprises a central shaft 10 linked to intermediate gears 9, each intermediate gear 9 itself being linked to a rotatable shaft 11 of an apparatus. The central shaft comprises two ends 12, 13. The central shaft 10 is linked to the power take-off member 1 by a gear 26 having convergent axes. Thus the power take-off member 1 transmits its rotational movement to the central shaft 10 through the gear 26 having convergent axes. The central shaft 10 transmits its rotational movement to the rotatable shafts 11 through the intermediate gears 9. According to one embodiment, the same can be used to achieve the power take-off and transmission to apparatus gears. In this case the gear 26 having convergent axes and the intermediate gear 9 are one and the same gear.

The gearbox according to this embodiment is particularly remarkable in that the power take-off member 1 is no longer linked to an end 12 of the central shaft 10, unlike the embodiments of the prior art, but is linked to the central shaft 10 at a zone located between the two ends 12, 13 of the central shaft. More precisely, the power take-off member 1 is preferably linked to the central shaft 10 at a zone 14 located between two intermediate gears 9.

Figure 4:
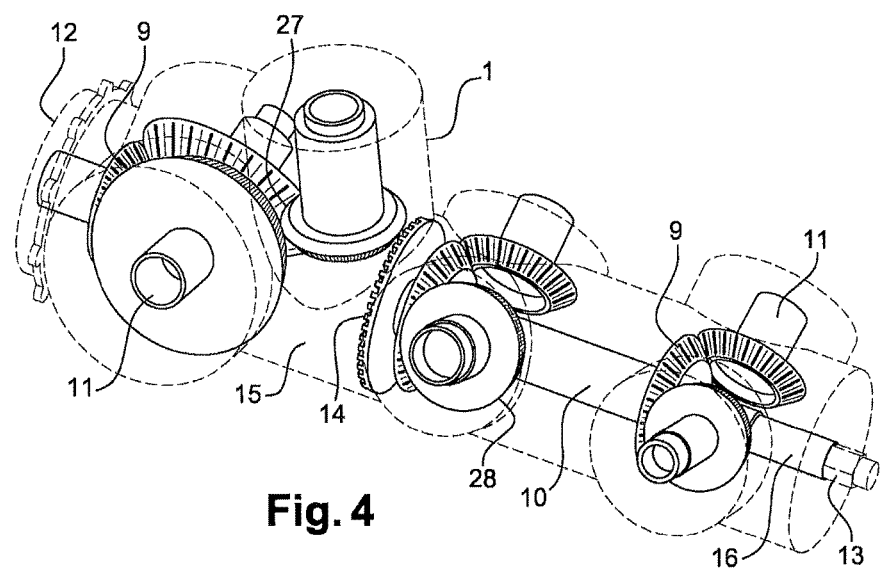
FIG. 4, a schematic perspective representation of a gearbox according to another embodiment of the invention.

With reference to FIG. 4, the central shaft 10 can also be made up of two parts 15, 16 linked independently of each other to the power take-off member 1, with the first part 15 of the central shaft 10 being linked to the power take-off member 1 by a first gear 27 having convergent axes, with the second part 16 of the central shaft 10 being linked to the power take-off member 1 by a second gear 28 having convergent axes. The two parts 15, 16 are preferably aligned. The first gear 27 having convergent axes may exhibit a reduction ratio which is different from that of the second gear 28 having convergent axes, so that the first part 15 of the central shaft 10 rotates at a different speed to the second part 16. Thus slow apparatus may be linked to one of the two parts 15, 16, whilst fast apparatus are linked to the other part.

Naturally the invention is not restricted to the embodiments described with reference to the figures and alternatives may be envisaged without leaving the context of the invention.

The invention claimed is:

1. A gearbox to be fixed to a turbine engine in order to drive at least one apparatus annexed to the turbine engine, the gearbox comprising:
a housing;

a power take-off member capable of engaging with a radial shaft of the turbine engine;

at least one kinematic chain located inside the housing and capable of transmitting a rotational movement of a power take-off to at least one rotatable shaft of an apparatus, the kinematic chain comprising a first end and a second end, wherein the power take-off member is linked to the kinematic chain by a gear having convergent axes located within the kinematic chain;

wherein the kinematic chain comprises at least one central shaft capable of transmitting the movement of the power take-off member to at least one rotatable shaft of an apparatus through at least one intermediate gear, where the central shaft comprises two ends, the power take-off member being linked to the central shaft by a gear having convergent axes, located between the first end and the second end of the central shaft, the central shaft comprising a first and second part, with the power take-off member being linked to the first part by a first gear with convergent axes and to the second part by a second gear with convergent axes.

2. The gearbox according to claim 1, wherein the first gear having convergent axes exhibits a reduction ratio which is different to that of the second gear having convergent axes.

3. A turbine engine comprising a gearbox according to claim 1.

4. The turbine engine according to claim 3, comprising a high-pressure shaft, with the power take-off member being linked to the high-pressure shaft.

5. The turbine engine according to claim 3, further comprising a low-pressure shaft, with the power take-off member being linked to the low-pressure shaft.

6. The turbine engine according to claim 3, further comprising an intermediate shaft, with the power take-off member being linked to the intermediate shaft.

7. A gearbox to be fixed to a turbine engine in order to drive at least one apparatus annexed to the turbine engine, the gearbox comprising:

a housing;

a power take-off member capable of engaging with a radial shaft of the turbine engine;

at least one kinematic chain located inside the housing and capable of transmitting a rotational movement of a power take-off to at least one rotatable shaft of an apparatus, the kinematic chain comprising a first end and a second end, wherein the power take-off member is linked to the kinematic chain by a gear having convergent axes located within the kinematic chain, said gearbox comprising two kinematic chains, each kinematic chain being capable of transmitting the rotation movement of the power take-off member to at least one rotatable shaft of an apparatus, each kinematic chain comprising a first end and a second end, the power take-off member being linked to each kinematic chain by a gear having convergent axes located between the first and the second end of each kinematic chain.

8. The gearbox according to claim 7, wherein the two gears having convergent axes exhibit different reduction ratios.

* * * * *